United States Patent
Kim et al.

(10) Patent No.: US 7,193,615 B2
(45) Date of Patent: Mar. 20, 2007

(54) METHOD FOR PROVIDING MOBILE TERMINAL WITH SOFTWARE KEYBOARD SUITABLE FOR LANGUAGE USED IN COUNTRY WHERE IT IS LOCATED

(75) Inventors: Mi-Yeon Kim, Seoul (KR);
Young-Wook Won, Seoul (KR);
Hoon-Kyu Park, Seoul (KR);
Sang-Soo Lee, Seoul (KR)

(73) Assignee: Korea Telecom, Sungnam-Shi (KR)

( * ) Notice: Subject to any disclaimer, the term of this patent is extended or adjusted under 35 U.S.C. 154(b) by 1057 days.

(21) Appl. No.: 09/737,498

(22) Filed: Dec. 14, 2000

(65) Prior Publication Data

US 2002/0047831 A1  Apr. 25, 2002

(30) Foreign Application Priority Data

Oct. 25, 2000  (KR) ................ 2000-62920

(51) Int. Cl.
*G09G 5/00* (2006.01)

(52) U.S. Cl. .................. 345/169; 455/419; 455/432.2; 455/566

(58) Field of Classification Search ............ 704/8; 707/10; 345/352, 156, 740, 169; 341/20; 455/457, 419, 432.2, 566; 701/211
See application file for complete search history.

(56) References Cited

U.S. PATENT DOCUMENTS

| | | | | |
|---|---|---|---|---|
| 5,523,754 A | * | 6/1996 | Eisen et al. ................... | 341/20 |
| 5,552,806 A | * | 9/1996 | Lenchik ...................... | 345/156 |
| 6,014,616 A | * | 1/2000 | Kim .............................. | 704/8 |
| 6,073,090 A | * | 6/2000 | Fortune et al. ................ | 704/8 |
| 6,085,098 A | * | 7/2000 | Moon et al. ................. | 455/457 |
| 6,356,905 B1 | * | 3/2002 | Gershman et al. ............ | 707/10 |
| 6,411,899 B2 | * | 6/2002 | Dussell et al. .............. | 701/211 |
| 6,469,713 B2 | * | 10/2002 | Hetherington et al. ....... | 345/740 |

* cited by examiner

*Primary Examiner*—Sumati Lefkowitz
*Assistant Examiner*—Srilakshmi K Kumar
(74) *Attorney, Agent, or Firm*—Blakely Sokoloff Taylor & Zafman

(57) ABSTRACT

A method for providing a mobile terminal with a software keyboard proper for the language of a country where it is located in a mobile communications network providing global roaming, comprises the steps of constructing a database on the information of multinational software keyboards in a server, transmitting the information on the location of the mobile terminal to the server, and transmitting the information on the proper software keyboard to the mobile terminal by ascertaining the country.

10 Claims, 5 Drawing Sheets

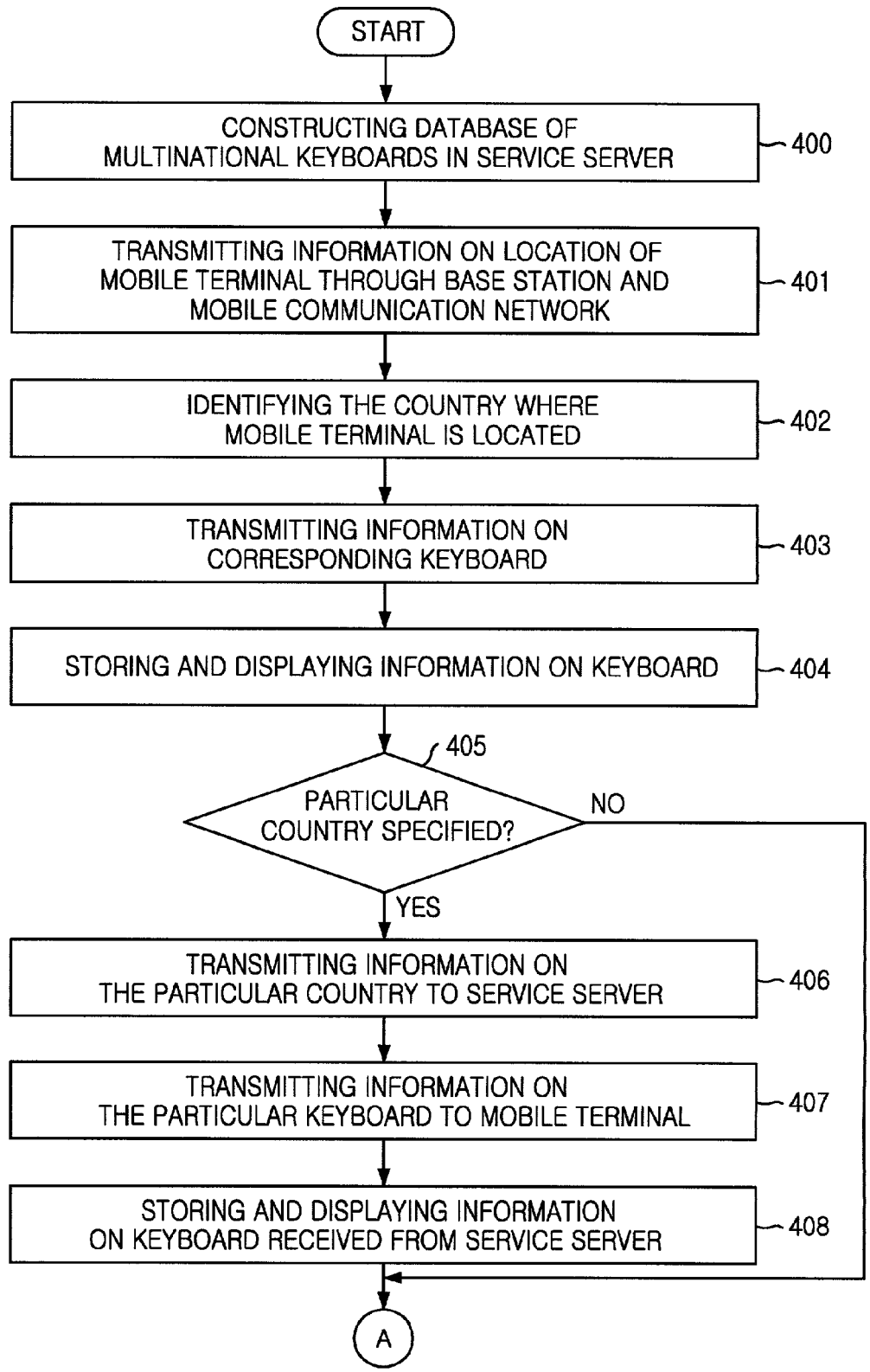

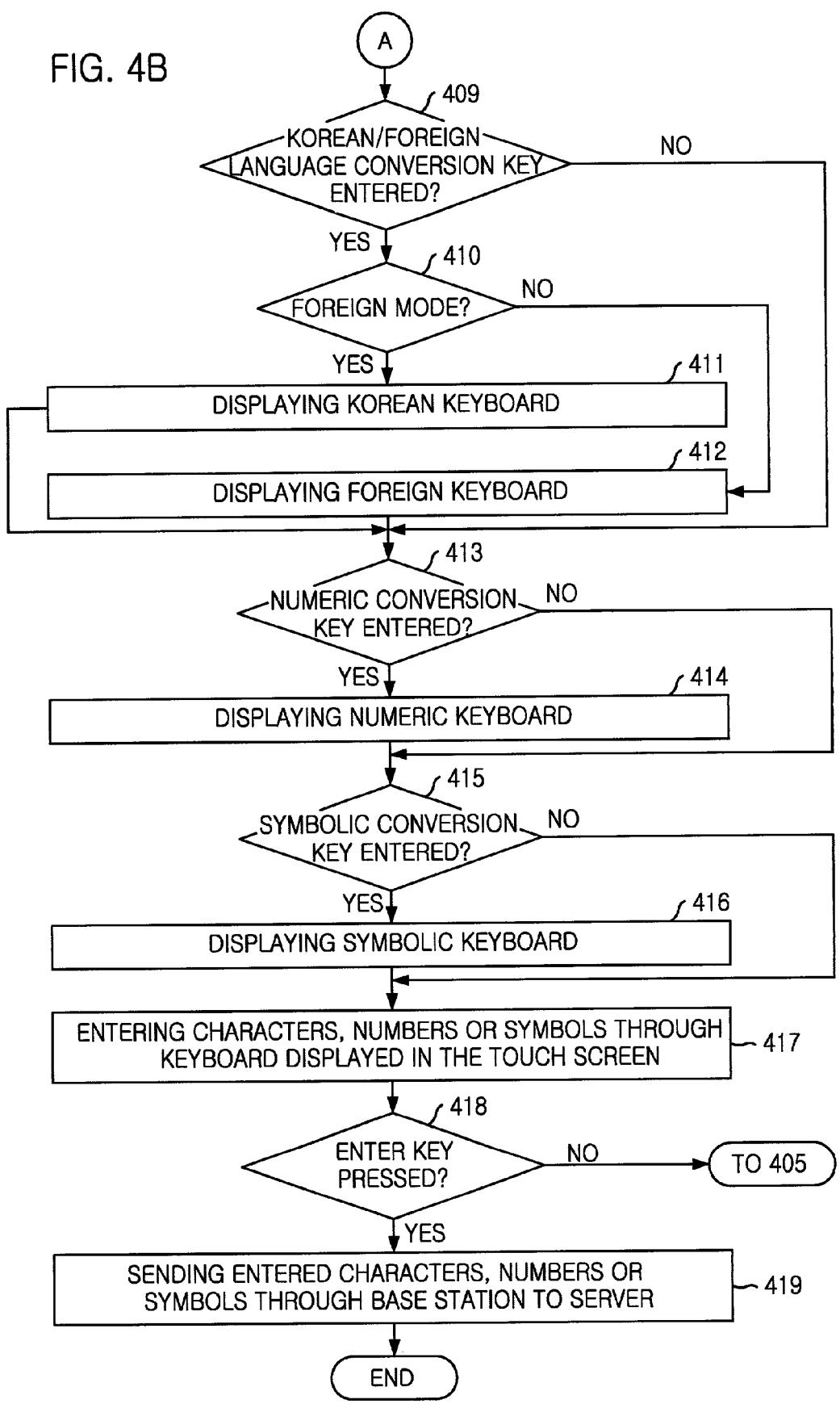

METHOD FOR PROVIDING MOBILE TERMINAL WITH SOFTWARE KEYBOARD SUITABLE FOR LANGUAGE USED IN COUNTRY WHERE IT IS LOCATED

FIELD OF THE INVENTION

The present invention relates to a method for providing a mobile terminal with a software keyboard proper for the language used in a country where it is located in a mobile communications network providing global roaming, and a recording medium programmed by a computer to perform such method.

PRIOR ART OF THE INVENTION

Referring to FIG. 1 for illustrating the procedure of entering characters in a conventional mobile terminal, it is usually designed to provide a software keyboard to enter Korean and English characters including both numbers and symbols through the touch screen. In such conventional mobile terminal, when entering characters, a software keyboard stored in the mobile terminal is displayed in the touch screen at step 100. When the user presses the Korean/English conversion key in order to enter Korean or English characters at step 110, the English or Korean keyboard is displayed in the touch screen at step 121 or 122 according as the previous mode is for Korean or English language at step 120.

In addition, when the user enters the numeric conversion key at step 130, the numeric keyboard is displayed in the touch screen at step 140. Or otherwise, if entering the symbolic conversion key at step 150, the symbolic keyboard is displayed in the touch screen at step 160.

Thus entering characters, numbers or symbols at step 170, the enter key is finally pressed to send them through the base station to the server at step 180. If not pressing the enter key at step 180, the mobile terminal returns to step 110 for the user to begin again with the Korean/English conversion key.

However, such conventional method provides the user only with the Korean, English, numeric, or symbolic keyboards stored in the mobile terminal, and therefore he cannot enter the characters of the other languages except Koran and English.

SUMMARY OF THE INVENTION

Therefore, it is an object of the present invention to provide a method for providing a mobile terminal with a software keyboard proper for the language used in a country where it is located in a mobile communications network providing global roaming, and a recording medium programmed by a computer to perform such method.

According to an aspect of the present invention, a method for providing a mobile terminal with a software keyboard proper for the language of a country where it is located in a mobile communications network providing global roaming, comprises the steps of constructing a database on the information of multinational software keyboards in a server, transmitting the information on the location of the mobile terminal to the server, and transmitting the information on the proper software keyboard to the mobile terminal by ascertaining the country.

According to another aspect of the present invention, there is provided a recording medium programmed by a computer to perform a method for providing a mobile terminal with a software keyboard proper for the language of a country where it is located in a mobile communications network providing global roaming, which comprises the steps of constructing a database on the information of multinational software keyboards in a server, transmitting the information on the location of the mobile terminal to the server, and transmitting the information on the proper software keyboard to the mobile terminal by ascertaining the country.

BRIEF DESCRIPTION OF THE DRAWINGS

The above and other objects and features of the instant invention will become apparent from the following description of preferred embodiments taken in conjunction with the accompanying drawings, in which:

FIGS. 4A and 4B are flow charts for illustrating the inventive process together with the process of entering characters.

PREFERRED EMBODIMENT OF THE INVENTION

Hereinafter, preferred embodiments of the present invention will be described in detail with reference to the accompanying drawings.

Figure 2:
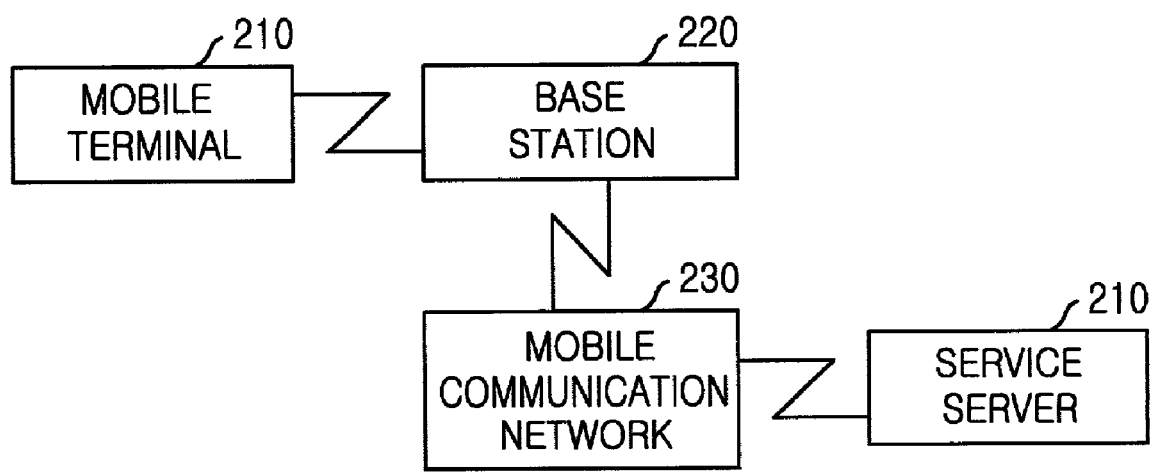
FIG. 2 is a block diagram for illustrating a conventional mobile communications network for applying the inventive method.

Referring to FIG. 2, a mobile terminal 210 comprises a memory device for storing Korean/English software keyboard, numeric keyboard, and symbolic keyboard, circuit for transmitting the information on its location through a base station 220 to a mobile communications network 230 to a service server 240 or vice versa, a touch screen for displaying the information, a CPU for controlling the memory device to store information and the touch screen to display it.

The service server 240 includes an input device for inputting the information on the multinational software keyboards, a memory device for storing the information, and a CPU for controlling the entire functions thereof. It sends the information on the software keyboard proper for the country where the mobile terminal is located through the mobile communication network 230 to the base station 220 to the mobile terminal 210.

Figure 3:
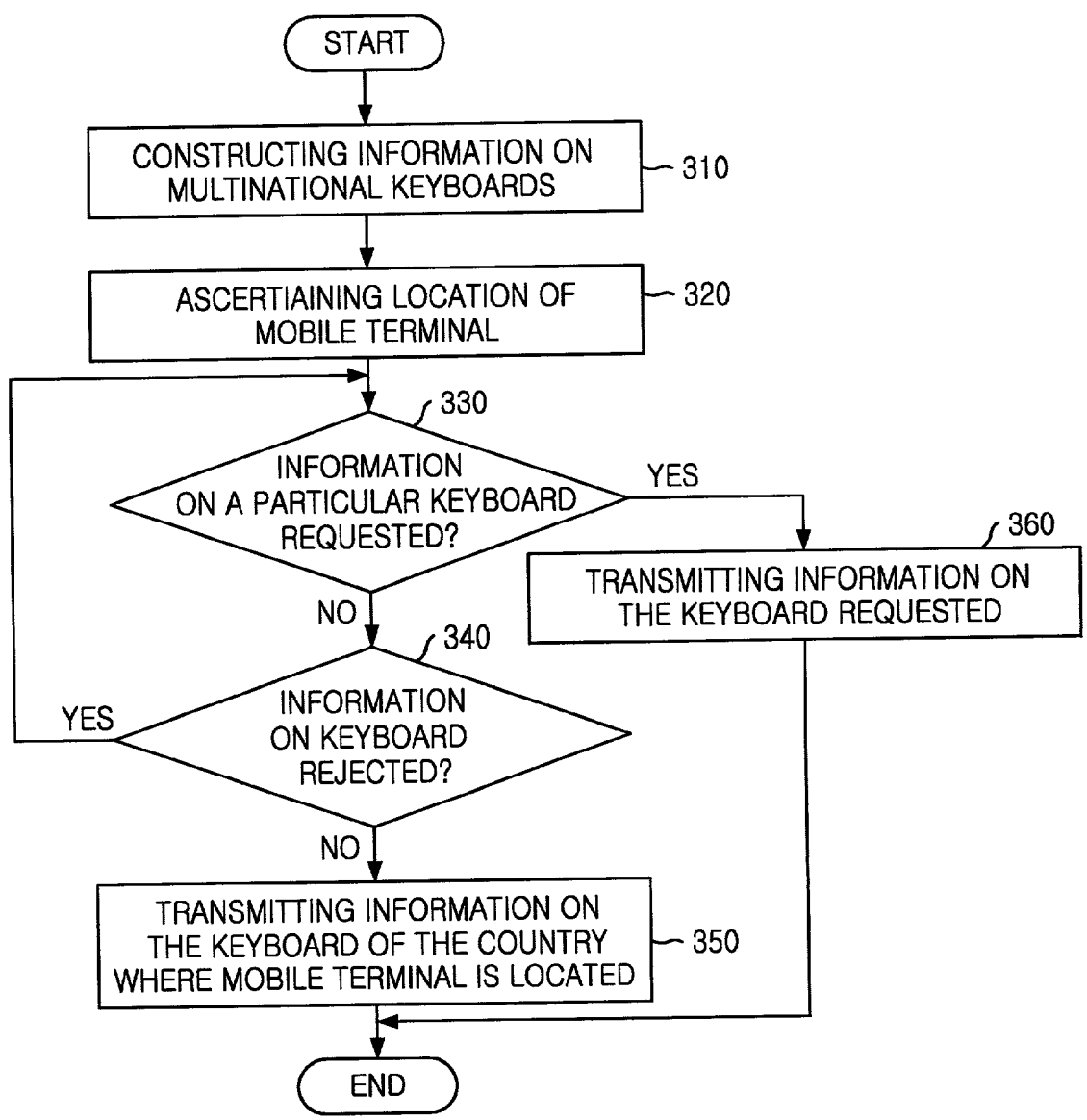
FIG. 3 is a flow chart for illustrating the inventive process of providing a mobile terminal with the software keyboard proper for the country where it is located.

Describing the process of providing the mobile terminal with a software keyboard proper for the language of the country where it is located in connection with FIG. 3, the service server firstly constructs the information on the multinational software keyboards at step 310. When the service server ascertains at step 320 the country where the mobile terminal is located by the location information received from the mobile terminal through the base station and mobile communications network, it sends the information on the keyboard proper for the language of the country through the mobile communications network to the base station to the mobile terminal 350.

Although the preferred embodiments of the invention have been disclosed for illustrative purpose, those skilled in the art will be appreciate that various modifications, additions and substitutions are possible, without departing from the scope and spirit of the invention as disclosed in the accompanying claims. In this case, when the user requests the information on the keyboard for the language of another country instead of the country where the mobile terminal is located at step 330, the service server retrieves and transmits it to the mobile terminal at step 360. Of course, if the mobile terminal sends a signal rejecting the information on a keyboard at step 340, the service server does not provide the information on any keyboard until the mobile terminal requests the information on a keyboard at step 330 or stops the sending of the signal rejecting the information on a keyboard.

Describing in more detail the process of providing the mobile terminal with the keyboard proper for the country where the mobile terminal is located in connection with FIGS. 4A and 4B, the service server firstly stores the information on the multinational keyboards at step 400, and receives the information of the country where the mobile terminal is located at step 401. Identifying the country at step 402, the service server transmits the information on the corresponding keyboard to the mobile terminal at step 403. Then, the mobile terminal stores the information on the keyboard, and displays it, at step 404.

However, if the user specifies a particular country except the country where he is located at step 405 to request the information on the keyboard of the particular country at step 406, the service server transmits it at step 407 to the mobile terminal to store and display the received information on the touch screen at step 408.

Figure 1:
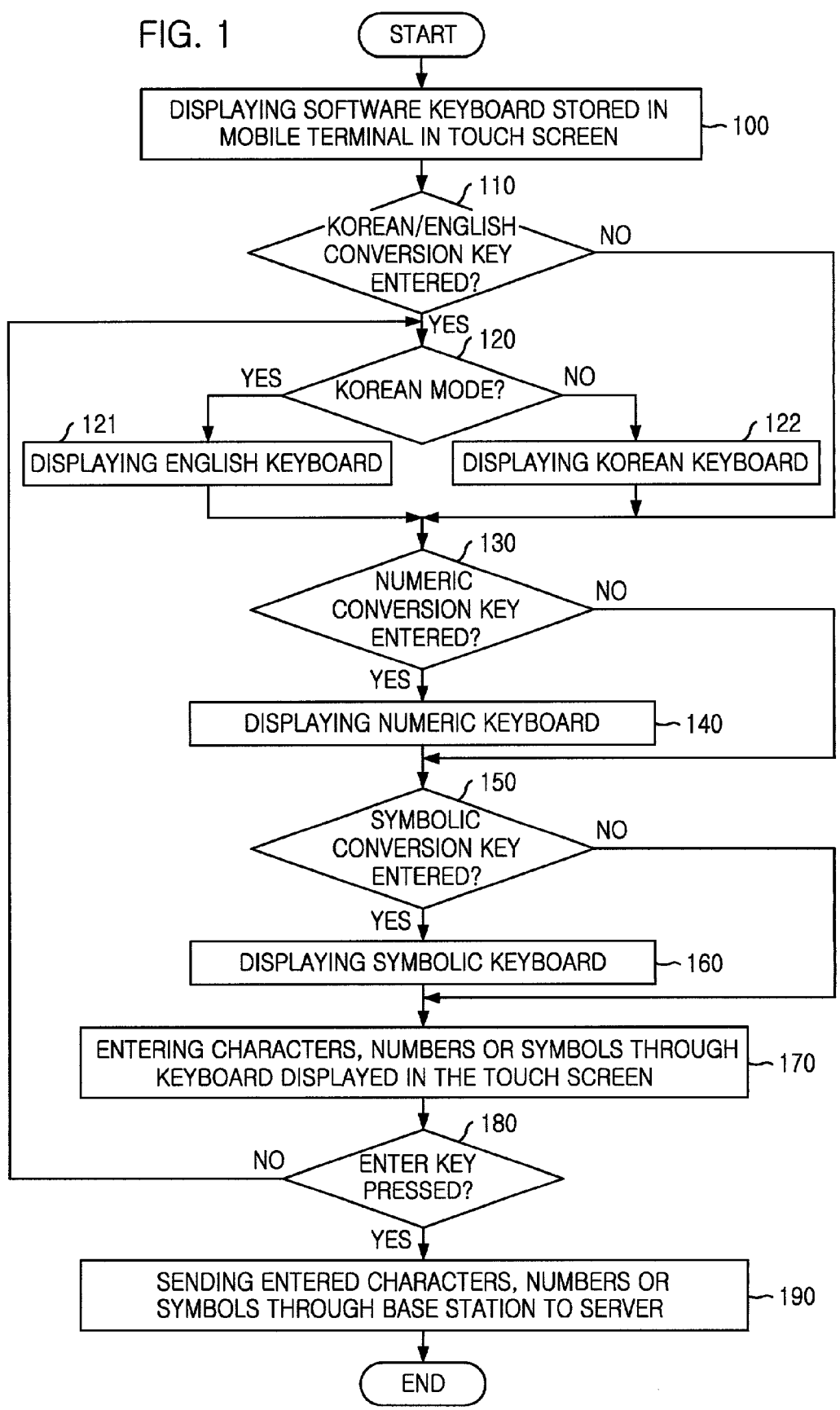
FIG. 1 is a flow chart for illustrating the process of entering characters in a conventional mobile terminal.

The information on the keyboard stored in the mobile terminal is used in the same way as shown in FIG. 1. Namely, when entering characters, the keyboard stored in the mobile terminal is displayed in the touch screen. When the user presses the Korean/foreign language conversion key in order to enter Korean or foreign language characters at step 409, the Korean or foreign keyboard is displayed in the touch screen at step 411 or 412 according as the previous mode is for foreign or Korean language at step 410.

In addition, when the user enters the numeric conversion key at step 413, the numeric keyboard is displayed in the touch screen at step 414. Or otherwise, if entering the symbolic conversion key at step 415, the symbolic keyboard is displayed in the touch screen at step 416.

Thus entering characters, numbers or symbols at step 417, the enter key is finally pressed to send them through the base station to the server at step 419. If not pressing the enter key at step 418, the mobile terminal returns to step 405 for the user to begin again with the Korean/foreign language conversion key.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A method for providing a mobile terminal with a software keyboard proper for the language of a country where it is located in a mobile communications network providing global roaming from a server through a mobile communication channel, comprising the steps of:
   a) constructing a database of information corresponding to multinational software keyboards in the server;
   b) transmitting location information of the mobile terminal to the server; and
   c) transmitting information about a proper software keyboard based on the location information to the mobile terminal from the server through the mobile communication channel.

2. The method as recited in claim 1, further including the step of d), if a predetermined software keyboard is requested from the server, transmitting information about the predetermined software keyboard to the mobile terminal instead of the proper software keyboard determined based on the location information.

3. The method as recited in claim 2, wherein the step d) includes the step of d1) canceling step c) or rejecting the proper software keyboard.

4. A recording medium programmed by a computer to perform a method for providing a mobile terminal with a software keyboard proper for the language of a country where it is located in a mobile communications network providing global roaming from a server through a mobile communication channel, the method comprising the steps of:
   a) constructing a database of information corresponding to multinational software keyboards in the server;
   b) transmitting location information of the mobile terminal to the server; and
   c) transmitting information about a proper software keyboard based on the location information to the mobile terminal from the server through the mobile communication channel.

5. A mobile communication system for performing a method for providing a mobile terminal with a software keyboard proper for the language of a country where it is located in a mobile communications network providing global roaming from a server through a mobile communication channel, comprising:
   a first means for constructing a database containing information corresponding to multinational software keyboards in the server;
   a second means for transmitting a location of the mobile terminal to the server; and
   a third means for transmitting a proper software keyboard based on the location information to the mobile terminal from the server through the mobile communication channel.

6. The mobile communication system as recited in claim 5, further comprising a fourth means for, if a predetermined software keyboard is requested from the server, transmitting information corresponding to the predetermined software keyboard to the mobile terminal instead of the proper software keyboard.

7. The mobile communication system as recited in claim 6, wherein the fourth means disables the third means or rejects the proper software keyboard if the predetermined software keyboard is requested.

8. A mobile terminal for performing a method for providing a mobile terminal with a software keyboard proper for the language of a country where it is located in a mobile communications network providing global roaming from a server through a mobile communication channel, comprising:
   a first means for transmitting a location of the mobile terminal to the server; and
   a second means for transmitting a proper software keyboard based on the location information to the mobile terminal from the server through the mobile communication channel,
   wherein the server includes means for constructing a database having information corresponding to a plurality of multinational software keyboards.

9. The mobile terminal as recited in claim 8, further comprising a third means for, if a predetermined software keyboard is requested from the server, transmitting information corresponding to the predetermined software keyboard to the mobile terminal instead of the proper software keyboard.

10. The mobile terminal as recited in claim 9, wherein the third means disables the second means or rejects the proper software keyboard if the predetermined software keyboard is requested.

* * * * *